(12) United States Patent
Mantell

(10) Patent No.: US 9,654,667 B1
(45) Date of Patent: May 16, 2017

(54) SYSTEM AND METHOD FOR STOCHASTIC VECTOR HALFTONING OF CONTONE DATA IN A PRINTER HAVING VARIABLE PRINTING PARAMETERS

(71) Applicant: Xerox Corporation, Norwalk, CT (US)

(72) Inventor: David A. Mantell, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/148,431

(22) Filed: May 6, 2016

(51) Int. Cl.
  H04N 1/405 (2006.01)
  H04N 1/52 (2006.01)
  G06K 15/10 (2006.01)
  B41J 2/21 (2006.01)

(52) U.S. Cl.
  CPC .......... *H04N 1/4055* (2013.01); *B41J 2/2121* (2013.01); *G06K 15/102* (2013.01); *H04N 1/52* (2013.01)

(58) Field of Classification Search
  None
  See application file for complete search history.

(56) References Cited

U.S. PATENT DOCUMENTS

| | | | |
|---|---|---|---|
| 5,673,121 A | 9/1997 | Wang | |
| 6,161,919 A | 12/2000 | Klassen | |
| 6,250,733 B1 | 6/2001 | Yao et al. | |
| 6,295,137 B1 | 9/2001 | Balasubramanian | |
| 6,373,594 B1 | 4/2002 | Yao et al. | |
| 7,095,530 B2 | 8/2006 | Mantell et al. | |
| 7,369,276 B2 | 5/2008 | Couwenhoven et al. | |
| 7,457,015 B2 | 11/2008 | Snyder et al. | |
| 7,508,558 B2 | 3/2009 | Yao et al. | |
| 8,040,567 B2 | 10/2011 | Hosaka et al. | |
| 8,077,332 B2 | 12/2011 | Kroon et al. | |
| 8,294,964 B2 | 10/2012 | He | |
| 8,632,149 B2 | 1/2014 | Xie | |
| 8,681,383 B2 | 3/2014 | Wang et al. | |
| 8,928,937 B2 | 1/2015 | Mantell | |
| 2003/0179410 A1 | 9/2003 | Velde | |
| 2004/0080762 A1 | 4/2004 | Kroon | |
| 2006/0279753 A1 | 12/2006 | Yao et al. | |
| 2007/0024651 A1 | 2/2007 | Snyder et al. | |

OTHER PUBLICATIONS

Paula Žitinski Elias, "Halftoning for Multi-Channel Printing—Algorithm Development, Implementation and Verification", Copyright © 2014, Department of Science and Technology, Campus Norrköping, Linköping University Sweden, pp. 1-130.

Qing Yu et al., "Stochastic Screen Halftoning for Electronic Imaging Devices", Department of Electrical Engineering University of Rochester, Rocheste, NY 14627, pp. 1-32.

*Primary Examiner* — Christopher D Wait

(74) *Attorney, Agent, or Firm* — Maginot Moore & Beck LLP

(57) ABSTRACT

An inkjet printer implements a method for identifying values for parameters for pixels to be printed by the printer. The method uses thresholds in a stochastic screen with a set of functions for the parameter for each primary color supplied to the printheads in the printer to identify values for the parameters. The parameters can be, for example, a number of drops to print for a color, a size of the drops to eject to form a pixel, or the number of inkjets to operate to form the pixel.

22 Claims, 3 Drawing Sheets

US 9,654,667 B1

SYSTEM AND METHOD FOR STOCHASTIC VECTOR HALFTONING OF CONTONE DATA IN A PRINTER HAVING VARIABLE PRINTING PARAMETERS

TECHNICAL FIELD

This disclosure relates generally to rendering continuous tone image data in printers, and more particularly to the rendering of continuous tone image data using stochastic vector halftoning.

BACKGROUND

Vector halftone methods are typically used to render color separations for the printing of images in an inkjet printer. In these methods, a single stochastic screen is used to render the continuous tone data for multiple and potentially all of the color separations. As used in this document, "continuous tone data" refers to multi-bit digital data and is also denoted as contone data in the art. For example, an eight-bit byte can be used to identify an intensity level from zero to 255 for a primary color used in a printer to form images. For each output pixel, the input continuous tone color values for the primary colors corresponding to a same pixel are used to calculate the combinations of colors that can be formed with the continuous tone color values. These color combinations are added in some predetermined order and compared to a threshold in the stochastic screen that corresponds to the pixel after each combination is added. When the sum of the color combinations exceeds the corresponding threshold in the stochastic screen, a position in one or more binary maps for the last added color combination corresponding to the pixel is assigned a binary '1'. Thus, the rendering process converts multi-bit data values for the primary colors in the original digital image to binary maps for each primary color used to print the image. Where a binary one occurs in the map for a color, a drop of that ink is ejected to form a pixel and where a binary zero occurs in the map for the color, no drop of that ink is ejected. The binary maps for the colors are used to operate the inkjets in the printheads of the printer. The rendering of continuous tone data to produce binary maps for colors is known as "halftoning."

Recently, printheads have been developed with inkjets that eject ink drops with variable volumes. For example, some printheads have inkjets that can eject ink drops with three different volumes. The inkjets are operated to eject differently sized drops by altering a parameter of the firing signal used to operate an inkjet. For example, firing signal waveforms having different amplitudes or frequencies can operate inkjets to eject ink drops of different sizes. In other known printers, the inkjets in the printheads can be operated to eject a variable number of drops having a constant volume in a single pixel location. Consequently, any position having a binary '1' in a binary map produced by a vector halftone rendering process can be formed on an ink receiving surface with one or more ink drops in some printers or different pixels can be formed with differently sized drops. Modifying a vector halftone rendering process to optimize the variable printing parameters to form a pixel would be beneficial.

SUMMARY

A vector halftoning process that renders continuous tone data into binary maps and also determines parameters other than color for forming pixels in an ink image includes mapping a plurality of continuous tone data values for a pixel in an image to a corresponding output level, identifying a score for each of one or more color combinations for the pixel in the image from the mapped output levels, identifying a pixel total color from the scores, comparing the pixel total color to a threshold in a single stochastic screen of thresholds that corresponds to the pixel in the image, modifying the pixel total color and comparing the modified pixel total color to the threshold in response to the pixel total color being less than the threshold, continuing to modify the modified pixel total color in response to the modified pixel total color being less than the threshold, identifying a last added color combination in response to one of the pixel total color and the modified pixel total color being greater than the threshold, selecting a primary color in the last added color combination, mapping the mapped output level for the selected primary color to a print output level, adding the scores for each color combination in the pixel total color or modified pixel total color that exceeded the threshold that does not contain the selected primary color to identify a pixel subtotal color, adding the pixel subtotal color to the print output level for the selected primary color to form a sum, comparing the sum to the threshold in the single stochastic screen, assigning a parameter value to a parameter for the pixel with reference to the comparison of the sum to the threshold in the single stochastic screen, and operating at least one inkjet in a printhead with reference to the assigned parameter value for the pixel to form a pixel in an output image that corresponds to the pixel.

A printer that uses a vector halftoning process to render continuous tone data into binary maps and also determine parameters other than color for forming pixels in an ink image includes a memory that is configured to receive from an image source a plurality of continuous tone data values for each pixel in an image, at least one printhead configured to operate inkjets to eject drops of ink to form pixels in ink images on an image receiving surface, and a controller operatively connected to the memory and the at least one printhead. The controller is configured to map a plurality of continuous tone data values for a pixel in an image stored in the memory to a corresponding output level, identify a score for each of one or more color combinations for the pixel in the image from the mapped output levels, identify a pixel total color from the scores, compare the pixel total color to a threshold in a single stochastic screen of thresholds that corresponds to the pixel in the image, modify the pixel total color and compare the modified pixel total color to the threshold in response to the pixel total color being less than the threshold, continue to modify the modified pixel total color in response to the modified pixel total color being less than the threshold, identify a last added color combination in response to one of the pixel total color and the modified pixel total color being greater than the threshold, select a primary color in the last added color combination, map the mapped output level for the selected primary color to a print output level, add the scores for each color combination in the pixel total color or modified pixel total color that exceeded the threshold that does not contain the selected primary color to identify a pixel subtotal color, add the pixel subtotal color to the print output level for the selected primary color to form a sum, compare the sum to the threshold in the single stochastic screen, assign a parameter value to a parameter for the pixel with reference to the comparison of the sum to the threshold in the single stochastic screen, and operate at least one inkjet in the printhead with reference to the assigned parameter value for the pixel to form a pixel in an output image on an image receiving member that corresponds to the pixel.

BRIEF DESCRIPTION OF THE DRAWINGS

The foregoing aspects and other features of the present disclosure are explained in the following description, taken in connection with the accompanying drawings.

DETAILED DESCRIPTION

Figure 1:
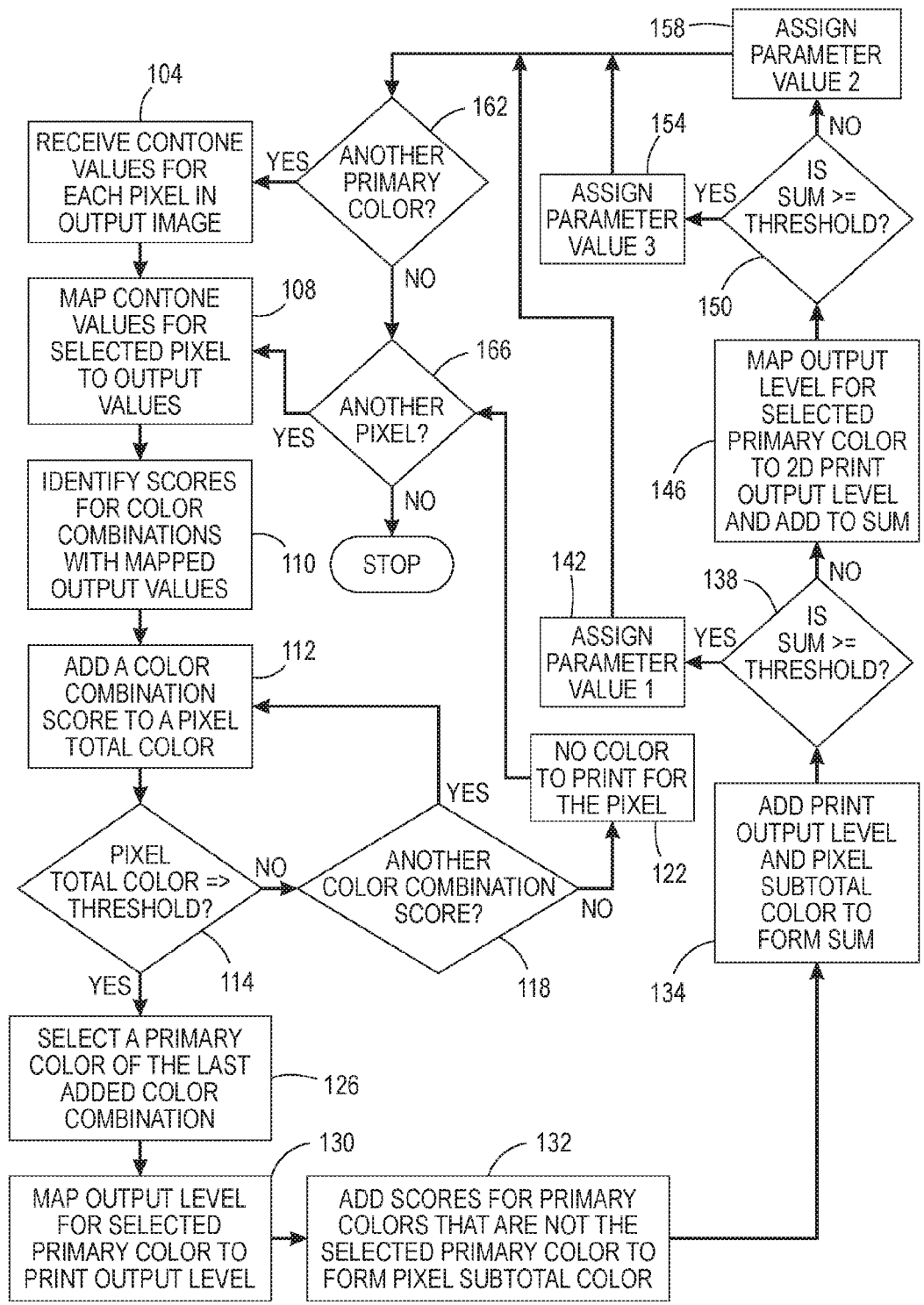
FIG. 1 is a flow diagram of a process that uses thresholds in a single stochastic screen to determine parameters other than color for forming pixels in an ink image.

For a general understanding of the present embodiments, reference is made to the drawings. In the drawings, like reference numerals have been used throughout to designate like elements.

Figure 2:
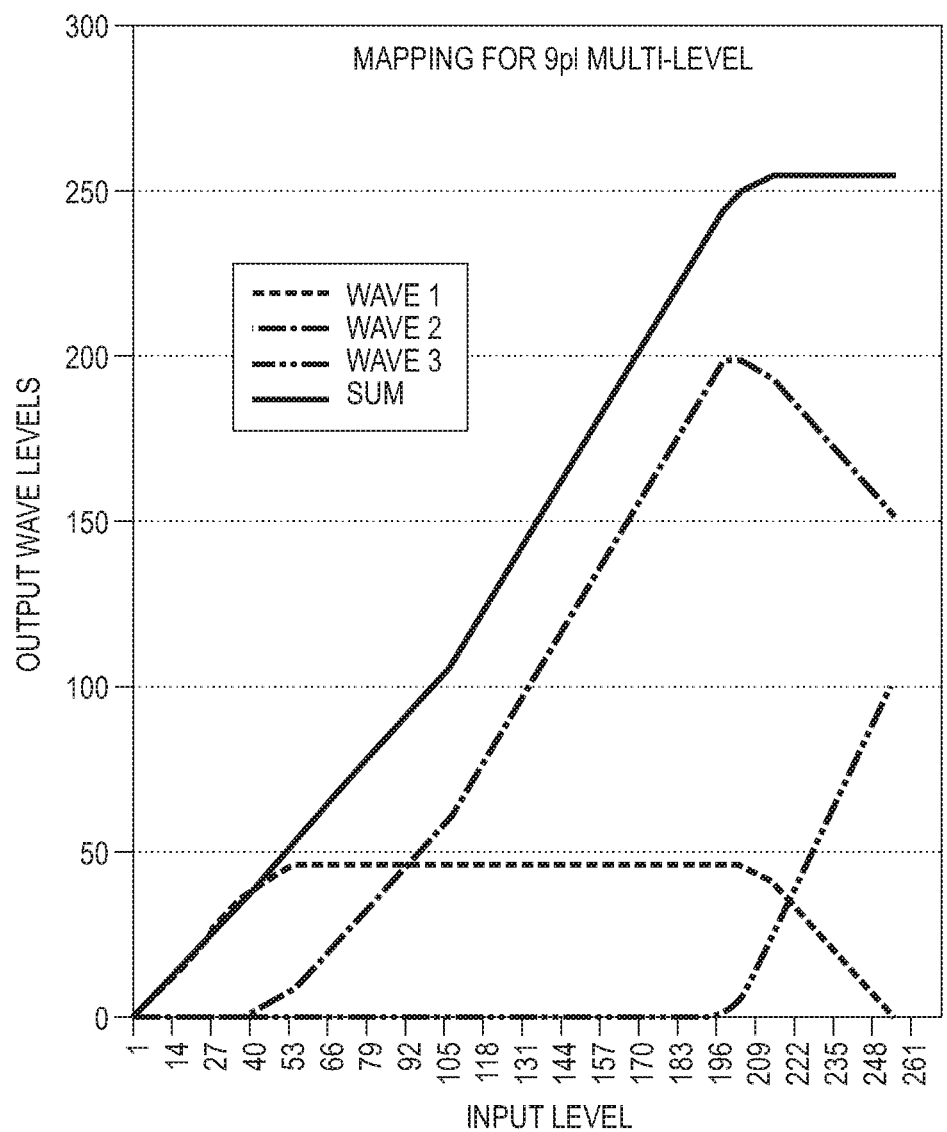
FIG. 2 depicts a set of functions for a primary color.

A flow diagram for a process that assigns parameters for printing pixels with reference to thresholds in a single stochastic screen is shown in FIG. 1. The process 100 begins with a plurality of continuous tone data values being received for each pixel in an image (block 104). Each continuous tone data value for a pixel corresponds to one of the primary colors of ink ejected by the printer to form ink images. Each continuous tone data value for a primary color is mapped to an output level using a function corresponding to the parameter to be assigned to the drops that form the pixel in the output image. As used in this document, "primary color" refers to each color of ink supplied to the printheads in the printer and includes white, clear, and black inks. For example, in a printer that ejects cyan, magenta, yellow, and black inks (CMYK), the process begins by mapping the continuous tone data values for each of these primary colors for the selected pixel to an output level. The mapping is made with reference to a set of functions for the parameter. An example of a set of functions for a parameter is shown in FIG. 2. As used in this document, the word "function" means a mapping of a set of domain values to a set of range values that corresponds to a value for a parameter. A set of functions, in this document, means a plurality of functions at least some of which correspond to different values for the parameter. The wave1, wave2, and wave3 functions in the set of functions depicted in FIG. 2 correspond to three values for a parameter, which in this example, defines the size of the drop ejected for a primary color. The wave1, wave2, and wave3 functions correspond to the parameter values of a small drop, a mid-size drop, and a large drop in one embodiment, respectively. The fourth function in the graph is a sum function. As used in this document, a "sum function" means a function that represents the summation of the individual parameter value functions over the range of the continuous tone data values. One constraint on the sum function is that the total of the parameter value functions at particular input continuous tone data values cannot exceed the maximum value permitted for a continuous tone data value. One constraint on the functions in the set of functions other than the sum function is that a sum of the mapped output values for each parameter function for a particular input continuous tone data value is also equal to or less than the maximum value for a threshold in the single stochastic screen. A set of functions is provided for each primary color used in the printer. The functions are sometimes determined empirically from experimental data.

Once the continuous tone data values are received, a pixel is selected and the continuous tone data values for the selected pixel are mapped to an output level using the sum function from the set of functions for each corresponding primary color (block 108). That is, for each primary color continuous tone data value for a pixel, a function is selected from the set of functions corresponding to the primary color and the selected function is used to identify a mapped output level for the continuous tone data value for that primary color. The mapped output levels for each primary color are used to identify scores for each possible color combination that can be formed with the mapped output levels (block 110). As used in this document, the term "identify" refers to any arithmetic operation on one or more numerical values to generate a numerical result. As used in this document, the term "score" refers to numerical results identified for each possible primary color combination that can be formed from the mapped output levels for a pixel. In a CMYK printer, a score is identified as a sum of the mapped output levels for each possible color combination. As used in this document, the term "color combination" refers to a combination of primary colors and the combinations include the primary colors in singular, in combinations of two colors at a time, in combinations of three colors at a time, up to a combination of all of the primary colors together. The possible color combinations in a CMYK printer are: C, M, Y, K, CM, CY, MY, CK, MK, YK, CMY, CMK, CYK, MYK, and CMYK. The sum of scores for these possible combinations is equal to or less than the maximum threshold in the single stochastic screen. The colors CM, CY, and MY can also denoted as the colors blue (B), green (G), and red (R), respectively. The abbreviations R, G, B are used for these colors in this document. Also, as used in this document, the term "color" refers to each possible color combination. As used in this document, a "darker" color is one that absorbs more light than a "lighter" color, which reflects more light than a darker color.

The process continues by identifying a pixel total color (block 112) and comparing the pixel total color to a threshold at a position in a stochastic screen that corresponds to the pixel position in the image (block 114). The term "pixel total color" means a sum of scores for possible color combinations until the sum reaches or exceeds a threshold at a position in a stochastic screen that corresponds to the selected pixel position in the output image. The scores for the color combinations are added in a predetermined order that typically begins with the score for the darkest color combination and then adds the score for the next darker color combination until the pixel total color reaches or exceeds the threshold. If all the scores are added (block 118) and the pixel total color does not exceed the threshold, then no drops are printed for the pixel in the output image (block 122) and the process determines whether another pixel is to be processed (block 166).

When the pixel total color reaches or exceeds the threshold, the process identifies a last added color combination as the color corresponding to the last score added to the pixel total color that caused the pixel total color to exceed the threshold. A primary color in the last added color combination is selected (block 126) and the mapped output level for the selected primary color is mapped to a print output level by at least one of the functions for a parameter value in the set of functions for the selected primary color (block 130). Also, the color combination scores in the pixel total color that correspond to colors that do not contain the selected primary color are added together to obtain a pixel subtotal color (block 132). The print output level for the selected primary color and the pixel subtotal color are added to form a sum (block 134). For example, if the last added color combination is CM, then the mapped output level for C is mapped to a print output level by at least one of the functions wave1, wave2, and wave3 in the set of functions corresponding to cyan. Also, the color combination scores in the pixel total color for the color combinations containing M, Y, and K only are added to identify the pixel subtotal color. Then the pixel subtotal color and the print output level for cyan are added to identify a sum. This sum is compared to the threshold from the stochastic screen (block 138) to determine which parameter value to assign to the mapped output level. If the sum reaches or exceeds the threshold, then parameter value 1 is assigned to the mapped output level (block 142). If the sum is less than the threshold value, the mapped output level for the primary color is mapped to a second print output level by another function other than the sum function in the set of functions and this second print output level is added to the sum used in the first comparison (block 146). This sum is compared to the threshold (block 150) and this comparison is used to assign one of the two remaining parameter values to the mapped output level (blocks 154 and 158). If other primary colors require processing (block 162), then the mapped output level for the other primary color is processed (blocks 126 to 162). When all of the primary colors of the last added color combination have been processed (block 162), the process determines if other pixels remain to be processed (block 166). If all of the pixels have assigned parameters, then the process stops. Otherwise, the process continues until all of the pixels have been processed.

In the embodiment described above, once the last added color combination is identified, the processing corresponding to block 130 to 158 can be described by the following equations:

If wave3($PC1_{mapped\ output\ level}$)+sum($not\ PC1_{mapped\ output\ levels}$)>=threshold assign $Parm_1$;

Else wave3($PC1_{mapped\ output\ level}$)+sum($not\ PC1_{mapped\ output\ levels}$)+wave2($PC1_{mapped\ output\ level}$)>=threshold assign $Parm_2$;

Else assign $Parm_3$ where wave3($PC1_{mapped\ output\ level}$) is the mapping of the mapped output level of a primary color in the last added color combination using a wave3 function, sum(not $PC1_{mapped\ output\ levels}$) is the sum of the mapped output levels for the primary colors in the scores that resulted in the pixel total color except the primary color mapped by the wave3 function, and wave2($PC1_{mapped\ output\ level}$) is the mapping of the mapped output level of a primary color in the last added color combination using a wave2 function. The threshold is the threshold from the stochastic screen that corresponds to the pixel being evaluated and $Parm_1$, $Parm_2$, and $Parm_3$ are the three parameter values that can be assigned to a parameter for a primary color. For example, the parameter drop size can be assigned one of the three parameter values $Parm_1$ (5 pl drop), $Parm_2$ (7 pl drop), and $Parm_3$ (12 pl drop). These equations are used to assign parameters to each color in the last added color combination. The reader should note that the last color combination can be only one primary color.

The process of FIG. 1 has been described with reference to a set of functions having three parameter value functions and a sum function. If only two functions other than the sum function are provided in the set of functions for the primary color, then the first comparison would have resulted in the first parameter value or the second parameter value being selected. If more than two functions other than the sum function are provided in the set of functions for the primary color, then the number of comparisons and the modification of the sum with a value map with another function in the set of functions is one less than the number of parameters values.

Figure 3:
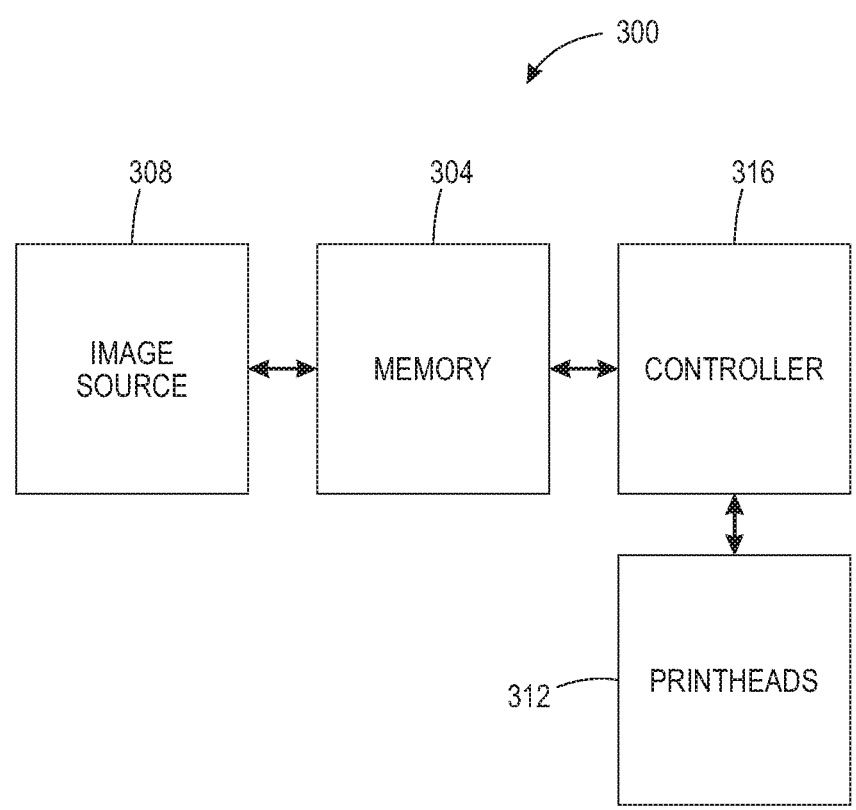
FIG. 3 is a block diagram of a printer that implements the process shown in FIG. 1.

FIG. 3 shows an inkjet printer that identifies parameters for pixels to be printed. The printer 300 includes a memory 304 that is configured to receive from an image source 308 a plurality of continuous tone data values for each pixel in an image, at least one printhead 312 that is configured to operate inkjets to eject drops of ink to form pixels in ink images on an image receiving surface, and a controller 316 that is operatively connected to the memory 304 and the printhead 312. The image source 308 can be a scanner, a computer, or other known source of continuous tone image data that is rendered by known vector halftoning processes for operating inkjets in a printer to form an ink image that corresponds to the continuous tone data image.

The controller is configured to perform the process shown in FIG. 1. Specifically, the controller executes programmed instructions stored in the memory 304 to operate one or more components in the printer 300 to map a plurality of continuous tone data values for a pixel in an image stored in the memory to a corresponding output level, identify a score for each of one or more color combinations for the pixel in the image from the mapped output levels, and identify a pixel total color from the scores. The controller also compares the pixel total color to a threshold in a single stochastic screen of thresholds that corresponds to the pixel in the image, modify the pixel total color and compare the modified pixel total color to the threshold in response to the pixel total color being less than the threshold, continue to modify the modified pixel total color in response to the modified pixel total color being less than the threshold, and identify a last added color combination in response to the pixel total color on the first iteration or the modified pixel total color on subsequent iterations being greater than the threshold. In response to the pixel total color or modified pixel total color exceeding the threshold, the controller selects a primary color in the last added color combination, maps the mapped output level for the selected primary color to a print output level, add the scores for each color combination in the pixel total color or modified pixel total color that exceeded the threshold that does not contain the selected primary color to identify a pixel subtotal color, add the pixel subtotal color to the print output level for the selected primary color to form a sum, and compare the sum to the threshold in the single stochastic screen. The controller assigns a parameter value to a parameter for the pixel with reference to the comparison of the sum to the threshold in the single stochastic screen and operates at least one inkjet in the printhead with reference to the assigned parameter value for the pixel to form a pixel in an output image on an image receiving member that corresponds to the pixel.

The controller maps the continuous tone data values to the output levels by selecting a plurality of functions corresponding to the parameter that are associated with a primary color for the mapped output level being mapped, selecting a function from the plurality of functions, and mapping the mapped output level to the print output level with reference to the selected function. The mapped output level is mapped to a print output level by another function in the set of functions and the print output level is added to the scores of color combinations not containing a selected primary color and the sum is compared to the threshold corresponding to the pixel to determine whether a first parameter value is assigned to the parameter. This process continues as noted above if more than two parameter values and functions are included in the set of functions to identify the value for the parameter associated with the pixel being processed. The process is performed for each pixel and then the halftone bit map generated by the vector halftoning process and the parameter values assigned to each pixel in the image are used to operate the inkjets in the printheads of the inkjet printer to form an ink image on an image receiving surface.

Those skilled in the art will recognize that numerous modifications can be made to the specific implementations described above. Therefore, the following claims are not to be limited to the specific embodiments illustrated and described above. The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for identifying parameters for pixels to be printed by an inkjet printer comprising:
    mapping a plurality of continuous tone data values for a pixel in an image to a corresponding output level;
    identifying a score for each of one or more color combinations for the pixel in the image from the mapped output levels;
    identifying a pixel total color from the scores;
    comparing the pixel total color to a threshold in a single stochastic screen of thresholds that corresponds to the pixel in the image;
    modifying the pixel total color and comparing the modified pixel total color to the threshold in response to the pixel total color being less than the threshold;
    continuing to modify the modified pixel total color in response to the modified pixel total color being less than the threshold;
    identifying a last added color combination in response to one of the pixel total color and the modified pixel total color being greater than the threshold;
    selecting a primary color in the last added color combination;
    mapping the mapped output level for the selected primary color to a print output level;
    adding the scores for each color combination in the pixel total color or modified pixel total color that exceeded the threshold that does not contain the selected primary color to identify a pixel subtotal color;
    adding the pixel subtotal color to the print output level for the selected primary color to form a sum;
    comparing the sum to the threshold in the single stochastic screen;
    assigning a parameter value to a parameter for the pixel with reference to the comparison of the sum to the threshold in the single stochastic screen; and
    operating at least one inkjet in a printhead with reference to the assigned parameter value for the pixel to form a pixel in an output image that corresponds to the pixel.

2. The method of claim 1, the mapping of the continuous tone data values to the output levels further comprising:
    selecting a plurality of functions corresponding to the parameter that are associated with a primary color for the continuous tone data value being mapped.

3. The method of claim 2, the mapping of the continuous tone data values to the output levels further comprising:
    selecting a function from the plurality of functions; and
    mapping the continuous tone data value to the output level with reference to the selected function.

4. The method of claim 3, the selecting of the function further comprising:
    selecting a sum function from the plurality of functions.

5. The method of claim 4 wherein a sum of scores for each color combination for a pixel is equal to or less than a maximum threshold in the single stochastic screen.

6. The method of claim 2 wherein a sum of the mapped output levels obtained with reference to parameter functions in the plurality of functions for each continuous tone data value is less than or equal to a maximum threshold in the single stochastic screen.

7. The method of claim 1, the identification of the scores further comprising:
    adding the mapped output levels for each primary color in a color combination.

8. The method of claim 1, the identification of the pixel total color further comprising:
    selecting a score from the scores identified for the one or more color combinations.

9. The method of claim 1, the modifying of the pixel total color further comprising:
    adding another score from the scores identified for the one or more color combinations to the pixel total color.

10. The method of claim 9, the addition of the scores further comprising:
    adding scores for darker color combinations to the pixel total color before adding scores for lighter combinations.

11. The method of claim 9, the addition of the scores further comprising:
    adding scores for lighter color combinations to the pixel total color before adding scores for darker combinations.

12. The method of claim 1, the mapping of the mapped output level further comprising:
    selecting a plurality of functions corresponding to the parameter that are associated with a primary color for the mapped output level being mapped;
    selecting a function from the plurality of functions; and
    mapping the mapped output level to the print output level with reference to the selected function.

13. The method of claim 12, the selecting of the function further comprising:
    selecting a sum function from the plurality of functions.

14. The method of claim 1 wherein the parameter value assigned to the parameter for the pixel identifies a number of drops to eject for the color component.

15. The method of claim 1 wherein the parameter value assigned to the parameter for the pixel identifies a number of ejectors to operate to form the color component.

16. The method of claim 1 wherein the parameter value assigned to the parameter for the pixel identifies a volume for a drop to be ejected for the color component.

17. The method of claim 1, the assignment of the parameter value further comprising:
    assigning a first parameter value to the parameter for the pixel in response to the sum being greater than the threshold.

18. The method of claim 17, the assignment of the parameter value further comprising:
    mapping the mapped output level to a second print output level;
    adding the second print output level to the sum;
    comparing the sum to the threshold;
    assigning a second parameter value to the parameter for the pixel in response to the sum being greater than the threshold; and assigning a third parameter value to the parameter for the pixel in response to the sum being less than the threshold.

19. The method of claim 1, the mapping of the mapped output level to the second print level further comprising:
selecting a plurality of functions corresponding to the parameter that are associated with a primary color for the mapped output level being mapped;
selecting a function from the plurality of functions; and
mapping the mapped output level to the print output level with reference to the selected function.

20. The method of claim 19, the selecting of the function further comprising:
selecting a sum function from the plurality of functions.

21. A printer that identifies parameters for pixels to be printed by an inkjet printer comprising:
a memory that is configured to receive from an image source a plurality of continuous tone data values for each pixel in an image;
at least one printhead configured to operate inkjets to eject drops of ink to form pixels in ink images on an image receiving surface; and
a controller operatively connected to the memory and the at least one printhead, the controller being configured to:
map a plurality of continuous tone data values for a pixel in an image stored in the memory to a corresponding output level;
identify a score for each of one or more color combinations for the pixel in the image from the mapped output levels;
identify a pixel total color from the scores;
compare the pixel total color to a threshold in a single stochastic screen of thresholds that corresponds to the pixel in the image;
modify the pixel total color and compare the modified pixel total color to the threshold in response to the pixel total color being less than the threshold;
continue to modify the modified pixel total color in response to the modified pixel total color being less than the threshold;
identify a last added color combination in response to one of the pixel total color and the modified pixel total color being greater than the threshold;
select a primary color in the last added color combination;
map the mapped output level for the selected primary color to a print output level;
add the scores for each color combination in the pixel total color or modified pixel total color that exceeded the threshold that does not contain the selected primary color to identify a pixel subtotal color;
add the pixel subtotal color to the print output level for the selected primary color to form a sum;
compare the sum to the threshold in the single stochastic screen;
assign a parameter value to a parameter for the pixel with reference to the comparison of the sum to the threshold in the single stochastic screen; and
operate at least one inkjet in the printhead with reference to the assigned parameter value for the pixel to form a pixel in an output image on an image receiving member that corresponds to the pixel.

22. The printer of claim 20, the controller being further configured to map the continuous tone data values to the output levels by:
selecting a plurality of functions corresponding to the parameter that are associated with a primary color for the mapped output level being mapped;
selecting a function from the plurality of functions; and
mapping the mapped output level to the print output level with reference to the selected function.

* * * * *